May 5, 1931.   H. N. PARSONS   1,804,110

BALL BEARING

Filed March 6, 1929   2 Sheets-Sheet 1

Inventor:
Harry N. Parsons,
By Dyrenforth, Lee, Chritton & Wiles,
Attys.

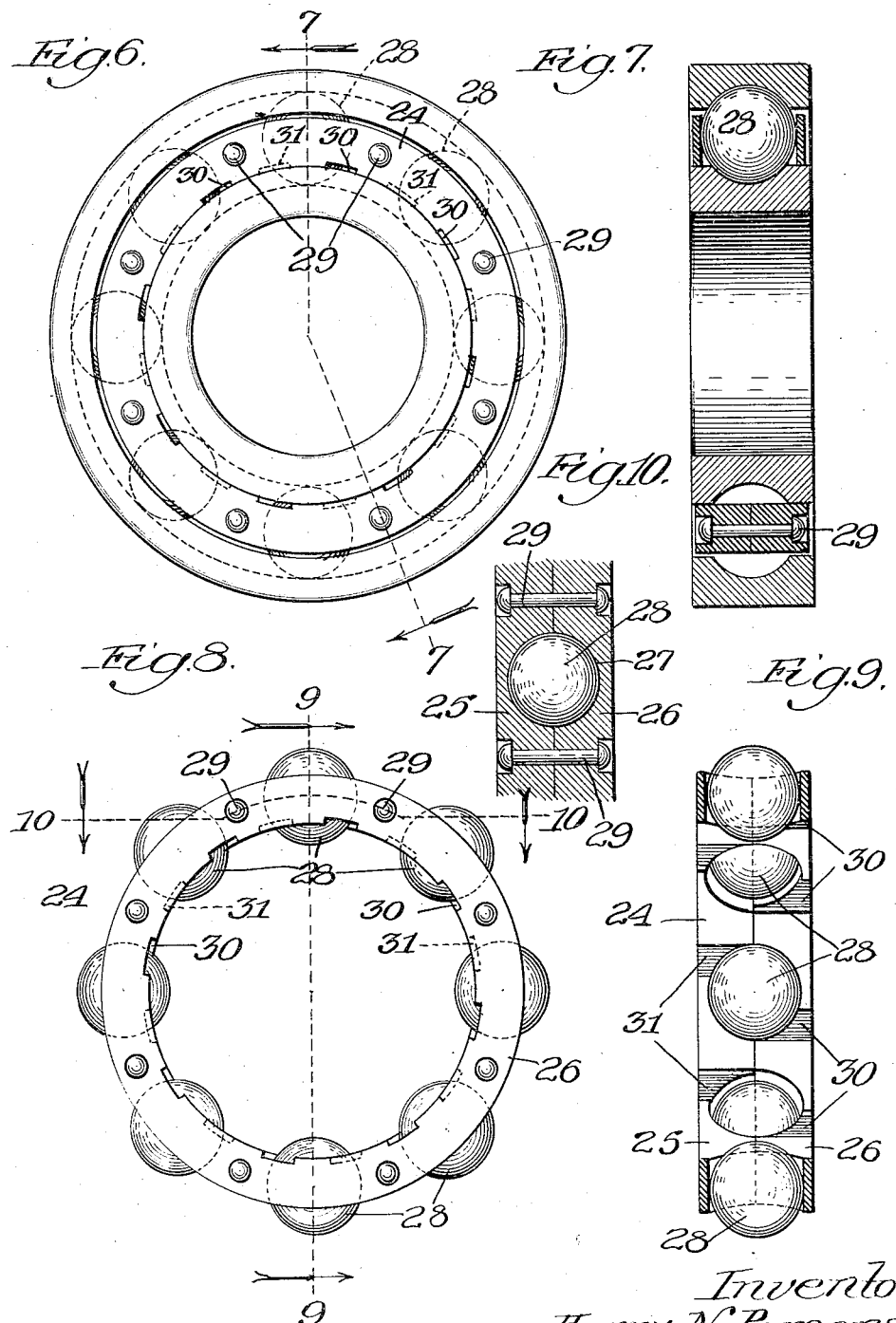

Patented May 5, 1931

1,804,110

UNITED STATES PATENT OFFICE

HARRY N. PARSONS, OF CHICAGO, ILLINOIS, ASSIGNOR TO MARLIN-ROCKWELL CORPORATION, A CORPORATION OF NEW YORK

BALL BEARING

Application filed March 6, 1929. Serial No. 344,799.

My invention relates more particularly to ball bearings of the type comprising a ball-retainer piloted on a race-way of the bearing; and the primary object of my invention is to provide for the effective scavenging from those portions of the piloting race-way which extend between adjacent balls, such foreign particles as may be contained therein, particularly more or less small metal particles produced in the manufacture of the bearings and not removed therefrom in the usual operations performed for cleaning the bearings.

Referring to the accompanying drawings:

Figure 6 is a view like Fig. 1 of another form in which my invention may be embodied.

Figure 7 is a section taken at the line 7—7 on Fig. 6 and viewed in the direction of the arrows.

Figure 8 is a face view of the ball retainer ring, with the balls therein, forming a part of the structure of Fig. 6.

Figure 9 is a section taken at the line 9—9 on Fig. 8 and viewed in the direction of the arrows; and Figure 10, a section taken at the irregular line 10—10 on Fig. 8 and viewed in the direction of the arrows.

Figure 1:
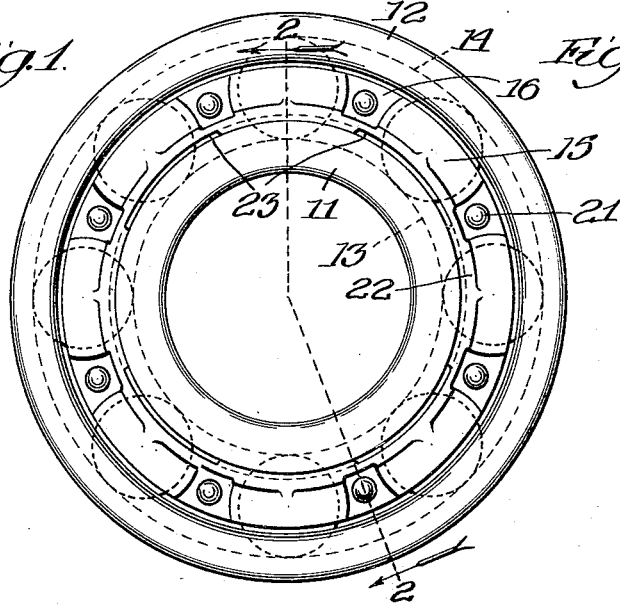
Figure 1 is a view in front elevation of a ball bearing constituting one of the forms in which my invention may be embodied.
Figure 2:
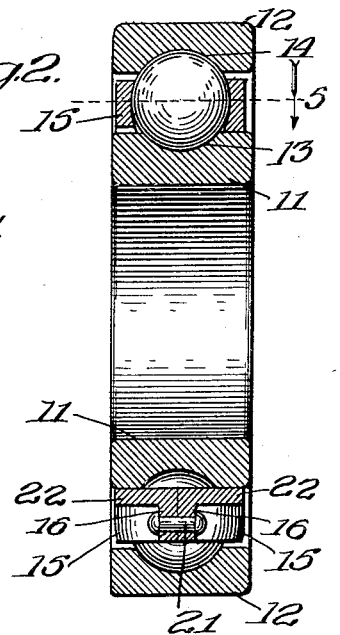
Figure 2 is a section taken at the irregular line 2—2 on Fig. 1 and viewed in the direction of the arrows.
Figure 3:
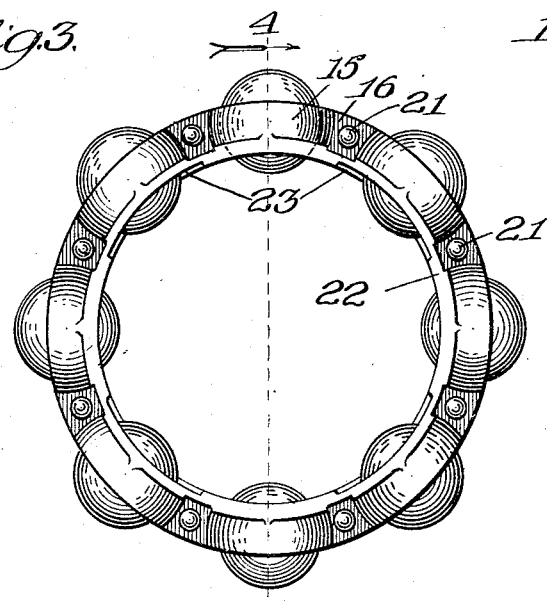
Figure 3, is a face view of the ball retainer, with the balls therein forming a part of the structure of Fig. 1.
Figure 4:
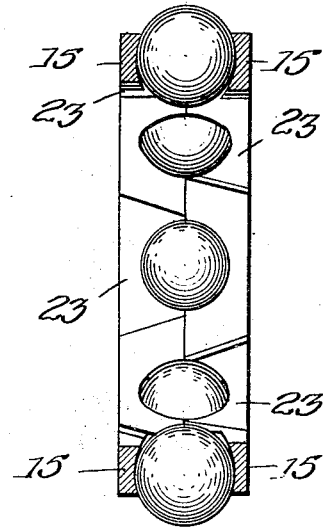
Figure 4 is a section taken at the line 4 on Fig. 3 and viewed in the direction of the arrow.
Figure 5:
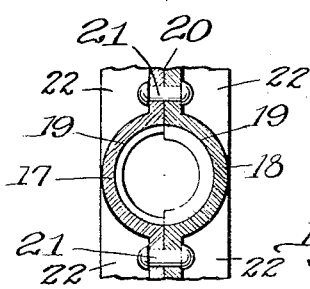
Figure 5 is a section taken at the line 5 on Fig. 2 and viewed in the direction of the arrow.

The embodiment of the invention shown in Figs. 1 to 5, inclusive, comprises inner and outer race members 11 and 12, respectively, which have ball races 13 and 14 formed therein.

The construction also comprises a series of balls 15 located in the race-ways and mounted in a ball retainer 16. The ball retainer shown comprises two similar sections 17 and 18 shaped to form ball retaining sockets 19, the sections intermediate the sockets referred to being deflected into flatwise opposing position as shown at 20 at which the ring sections are connected together as by the rivets represented at 21.

The structure shown is of the type in which the ball retainer is piloted on one of the race members, the retainer being shown as piloted on the inner race member at shoulder portions 22 of the retainer and located between adjacent ball-receiving sockets.

In this particular construction the number of balls shown is such that no ball filling slots are necessary in the sides of the ball recesses. The balls are first assembled in the ball races by displacing the inner race member to one side of the outer race member, inserting the balls between these race members and centering the inner race member while distributing the balls about the ball race. The sections of the ball retainer are then placed against the balls from opposite sides thereof to the position shown and the rivets 21 inserted and set thereby retaining the ball bearing in the finished form in a well known manner.

The piloting of the ball retainer on one of the race members as stated forms a relatively tight journalling fit between these parts thereby causing the portions of the race-way 13 between adjacent balls to be closed, unless vented in accordance with my invention as hereinafter described, such closure presenting the great objection that any particles, such as for example metal, which may remain in the runway 13 produced as for example in the manufacturing of the bearings and not removed therefrom in the usual cleansing operations, interfere with the proper functioning of the bearing and produce undue wear.

In accordance with my invention I provide for the scavenging of these spaces automatically by the operation of the bearing itself immersed in oil, such immersion being in accordance with common practice, the ring 16 to this end being cut away at intervals on its inner cylindrical surface to form recesses 23 which are disposed coincident with the balls and extend circumferentially in opposite directions beyond the centers thereof as shown. These recesses alternate with each other at opposite sides of the ring 16 as shown and form vents for all of the spaces defined by the groove 13 and adjacent balls through which accumulations of solid particles in these spaces may be scavenged.

In the use of the bearing relative rotary movement between the inner race member 11 and the ball retainer, occurs, and as the bearing is immersed in oil the rotation of the balls in the grooves 13 forces the oil ahead of the balls and along the groove producing more or less of a splashing action, the vents referred to being so disposed as shown that they are in the line of the path of the material splashed as stated which produces a very effective scavenging of the particles to be removed. Each of the spaces referred to is vented by the arrangement shown and the arrangement of the vents is such that regardless of the direction of relative rotation of the race member 11 and the ring 16 a vent for each space and in line with the splash action referred to is provided.

In the construction shown in Figs. 6 to 10, inclusive, and which is preferably employed in the heavier types of bearing constructions, the ball retainer ring, corresponding with the ring 16 of the construction of the preceding figures, is represented at 24, this ring, preferably cast, being formed of similar sections 25 and 26 containing pockets 27 in which the balls, represented at 28, and corresponding with the balls 15 of the construction of the preceding figures, are located, these sections being connected together by rivets 29.

The manner of assembling the parts of this construction may be that above described in connection with the construction shown in Figs. 1 to 5, inclusive. In this arrangement the ring 24 is piloted on the inner race member of the bearing and to provide for the venting of the spaces between adjacent balls, recesses 30 and 31 opening into the groove of the inner race-way and arranged at opposite sides of the latter and in staggered relation are provided. The recesses 30 and 31 which form vents for the spaces referred to are preferably so located, as shown, as to be in line with the direction in which the oil splashed by the relative movement of the balls and inner race-way is thrown laterally outwardly to effect the desired scavenging of these spaces, it being noted that by the arrangement of the recesses 30 and 31, as shown, each of such spaces is so vented that regardless of the relative rotation of the balls and inner race-way each space will have a vent opening in line with the movement of the splashed oil.

While I have illustrated and described the ball retainer in each of the two constructions shown, as being piloted on the inner race-way, it will be understood that the invention also applies to a construction in which the ball retainer is piloted on the outer race way, in which latter case it will be understood that the vents would be provided at the outer periphery of the ball retainer instead of at the inner periphery thereof.

Furthermore, it will be understood that the invention may be embodied in other forms of structures and those illustrated variously modified and altered without departing from the spirit of my invention.

What I claim as new, and desire to secure by Letters Patent, is:

1. In a ball bearing, the combination of inner and outer race-ways, and a ball retainer for said balls piloted on one of said race-ways and containing vents in the surface of said ball retainer which opposes the one of the race-ways on which said ball retainer is piloted and opening laterally of said retainer and also opening into said last-referred-to race-way at all of the spaces between adjacent balls, the radial depth of said vents being appreciably less than the radial thickness of said retainer.

2. In a ball bearing, the combination of inner and outer race-ways, a set of balls in said race-ways, and a ball retainer for said balls piloted on one of said race-ways and containing vents opening laterally of said retainer and located at the balls and extending circumferentially beyond the centers of the balls and opening into said last-referred-to race-way at all of the spaces between adjacent balls.

3. In a ball bearing, the combination of inner and outer race-ways, a set of balls in said race-ways, and a ball retainer for said balls piloted on one of said race-ways and containing vents in the surface of said ball retainer which opposes the one of the race-ways on which said ball retainer is piloted, said vents opening laterally of said retainer and being located adjacent the balls and extending circumferentially beyond the centers of the balls and opening into said last-referred-to race-way at all of the spaces between adjacent balls.

4. In a ball bearing, the combination of inner and outer race-ways, a set of balls in said race-ways, and a ball retainer for said balls piloted on one of said race-ways, said ball retainer being formed of sheet metal sections bent to form spaced apart ball-receiving pockets and presenting a shoulder portion at which the retainer is piloted as above stated, said shoulder portion extending into the spaces between adjacent pockets and said ball retainer containing vents opening through said shoulder portion into said last-referred-to race-way at all of the spaces between adjacent balls, said vents opening laterally of said retainer.

5. In a ball bearing, the combination of inner and outer race-ways, a set of balls in said race-ways, and a ball retainer for said balls piloted on one of said race-ways, said ball retainer being formed of sheet metal sections bent to form spaced apart ball-receiving pockets and presenting a shoulder portion at which the retainer is piloted as above stated, said shoulder portion extending into the spaces between adjacent pockets and said ball retainer containing vents opening through said shoulder portion into said last-referred-to race-way at all of the spaces between adjacent balls, said vents having a radial depth less than the thickness of said shoulder portion and opening laterally of said retainer.

HARRY N. PARSONS.